United States Patent
Davidson et al.

(10) Patent No.: US 11,169,333 B2
(45) Date of Patent: Nov. 9, 2021

(54) PUSH-PULL BOOT CONNECTOR FOR FIBER OPTIC CABLES

(71) Applicant: AFL IG LLC, Duncan, SC (US)

(72) Inventors: Aran James Russell Davidson, Buckinghamshire (GB); Asher Leong Raven, Buckinghamshire (GB)

(73) Assignee: AFL IG LLC, Duncan, SC (US)

( * ) Notice: Subject to any disclaimer, the term of this patent is extended or adjusted under 35 U.S.C. 154(b) by 0 days.

(21) Appl. No.: 16/701,886

(22) Filed: Dec. 3, 2019

(65) Prior Publication Data

US 2020/0103598 A1 Apr. 2, 2020

Related U.S. Application Data

(63) Continuation of application No. 16/056,907, filed on Aug. 7, 2018, now Pat. No. 10,634,854.

(60) Provisional application No. 62/640,914, filed on Mar. 9, 2018, provisional application No. 62/613,266, filed on Jan. 3, 2018.

(51) Int. Cl.
*G02B 6/38* (2006.01)

(52) U.S. Cl.
CPC ......... *G02B 6/3831* (2013.01); *G02B 6/3825* (2013.01); *G02B 6/3887* (2013.01); *G02B 6/3893* (2013.01); *G02B 6/3821* (2013.01); *G02B 6/3879* (2013.01)

(58) Field of Classification Search
CPC .. G02B 6/3831; G02B 6/3825; G02B 6/3887; G02B 6/3893
USPC ........................................................ 385/86
See application file for complete search history.

(56) References Cited

U.S. PATENT DOCUMENTS

| 5,321,784 A | 6/1994 | Cubukciyan | |
|---|---|---|---|
| 2007/0190834 A1 | 8/2007 | Koreeda | |
| 2008/0220658 A1* | 9/2008 | Caveney | H01R 13/514 439/676 |
| 2012/0308183 A1* | 12/2012 | Irwin | G02B 6/38875 385/56 |
| 2014/0205257 A1 | 7/2014 | Durrant | |
| 2014/0328560 A1* | 11/2014 | Ahmed | G02B 6/3887 385/87 |
| 2015/0177463 A1* | 6/2015 | Lee | G02B 6/3897 385/76 |
| 2016/0154190 A1 | 6/2016 | Lin | |
| 2016/0231512 A1 | 8/2016 | Seki | |
| 2017/0139158 A1* | 5/2017 | Coenegracht | G02B 6/3825 |
| 2017/0276275 A1 | 9/2017 | Beemer | |

(Continued)

FOREIGN PATENT DOCUMENTS

| WO | WO2015/103783 A1 | 8/2007 |
|---|---|---|
| WO | WO2017/123264 A1 | 7/2015 |

OTHER PUBLICATIONS

AFL Telecommunications LLC; International Patent Application No. PCT/US2019/012026; International Search Report; dated Apr. 29, 2019; (2 pages).

*Primary Examiner* — Jerry M Blevins
(74) *Attorney, Agent, or Firm* — Dority & Manning, P.A.

(57) ABSTRACT

A push-pull connection includes a push-pull boot connector and an adapter, which are connected together and retained with a latching mechanism. The push-pull boot connector includes a connector housing and a remote release push-pull strain relief boot. The connector housing, when pulled away from the mating face of the adapter, via the strain relief boot, will detach the latching mechanism.

17 Claims, 17 Drawing Sheets

(56) References Cited

U.S. PATENT DOCUMENTS

2017/0307831 A1   10/2017  Katagiyama
2020/0278502 A1*   9/2020  Van Baelen ........... G02B 6/381

* cited by examiner

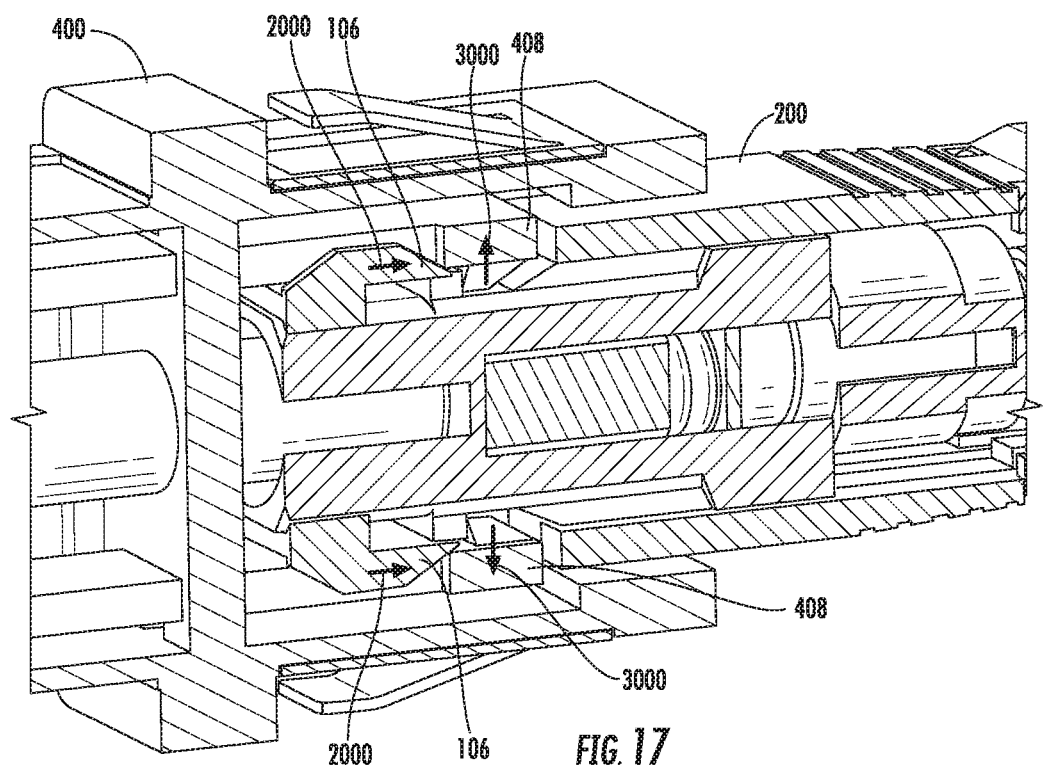

PUSH-PULL BOOT CONNECTOR FOR FIBER OPTIC CABLES

CROSS-REFERENCE TO RELATED APPLICATIONS

This application is a continuation of U.S. patent application Ser. No. 16/056,907, filed Aug. 7, 2018 in the United States Patent and Trademark Office, which claims the benefit of priority from U.S. Provisional Application No. 62/613,266, filed Jan. 3, 2018 in the United States Patent and Trademark Office, and U.S. Provisional Application No. 62/640,914, filed Mar. 9, 2018 in the United States Patent and Trademark Office, the disclosures of which are incorporated by reference herein in their entirety.

FIELD OF THE INVENTION

The present subject matter relates generally to connectors for fiber optic cables.

BACKGROUND OF THE INVENTION

A datacenter may include a large number, e.g., several dozen or even hundreds, of cables, e.g., fiber optic cables or other data cables, connected to a hub such as a headend, a server, or a main distribution frame (MDF). The space within datacenters is at a premium, and the density (amount of connections in a defined space) often limits which type or types of connectors can be used for connecting the fiber optic cables to the hub. One common connector design is referred to as LC connectors. However, such connectors are limited to a count of 144 fibers per panel, e.g., a standard 19" wide panel with a standard height of 1 RU (rack unit), due to the physical size of the connector and the space envelope available. Access to install or remove this type of connector is difficult at high densities.

Some LC connector designs include an extended pulling latch to facilitate removal. However, such extended latches can increase the amount of precious space within the datacenter taken up by each connection. Moreover, the latch mechanisms must be manipulated directly, e.g., by a user's hand or fingers, and therefore accessibility is still an issue.

Improved latching features, e.g., improved accessibility to release the latching mechanism, for various connector types are thus desired.

BRIEF DESCRIPTION OF THE INVENTION

Aspects and advantages of the invention will be set forth in part in the following description, or may be apparent from the description, or may be learned through practice of the invention.

In a first exemplary embodiment, a push-pull connection is provided. The push-pull connection includes a push-pull boot connector extending along a longitudinal direction from a proximal end to a distal end. The push-pull boot connector includes a connector housing defining the proximal end of the push-pull boot connector at a first end of the housing. A second end of the connector housing is connected to a first end of a strain relief boot. A second end of the strain relief boot defines the distal end of the push-pull connector. A latch release ramp is provided on one of the connector housing and the strain relief boot. The push-pull connection also includes an adapter having a channel configured to receive the proximal end of the push-pull boot connector. The adapter also includes a latch positioned in the channel of the adapter to engage the push-pull boot connector when the push-pull boot connector moves relative to the adapter in a first direction along the longitudinal direction. The latch retains the push-pull boot connector in the channel of the adapter when the latch engages the push-pull boot connector. The latch release ramp of the push-pull boot connector is configured to disengage the latch of the adapter from the push-pull boot connector when the push-pull boot connector moves relative to the adapter in a second direction opposing the first direction.

In a second exemplary embodiment, a push-pull boot connector is provided. The push-pull boot connector extends along a longitudinal direction from a proximal end to a distal end. The proximal end of the push-pull boot connector is configured to be retained in a channel of an adapter by a latch of the adapter. The push-pull boot connector includes a connector housing defining the proximal end of the push-pull boot connector at a first end of the housing. A second end of the connector housing is connected to a first end of a strain relief boot. A second end of the strain relief boot defines the distal end of the push-pull connector. A latch release ramp is provided on one of the connector housing and the strain relief boot. The push-pull boot connector is configured to engage the latch of the adapter when the push-pull boot connector is pushed into the adapter in a first direction along the longitudinal direction. The latch release ramp is configured to disengage the latch of the adapter from the push-pull boot connector when the push-pull boot connector is pulled out of the adapter in a second direction opposing the first direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 17 provides an enlarged view of a portion of FIG. 16.

DETAILED DESCRIPTION

Figure 1:
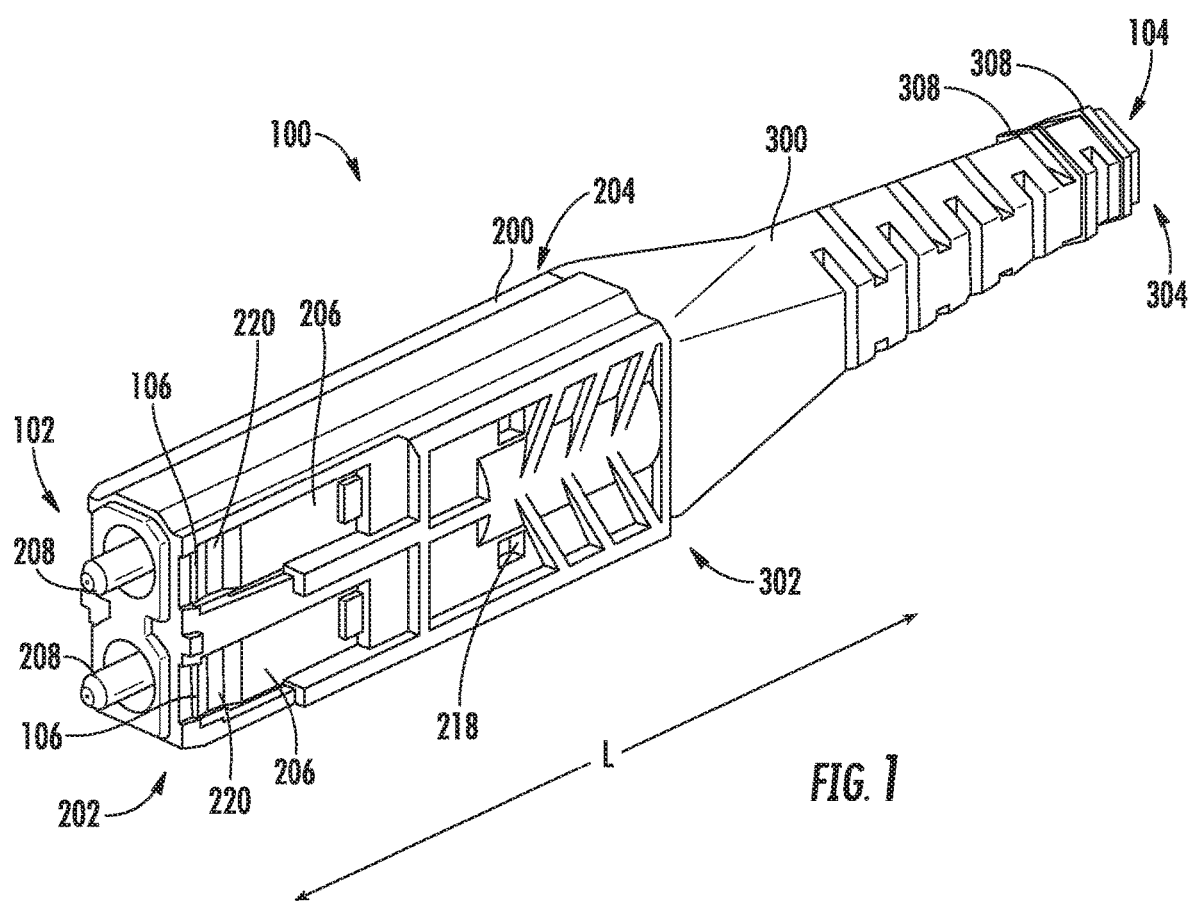
FIG. 1 provides a perspective view of a push-pull boot connector according to one or more exemplary embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction.

Figure 2:
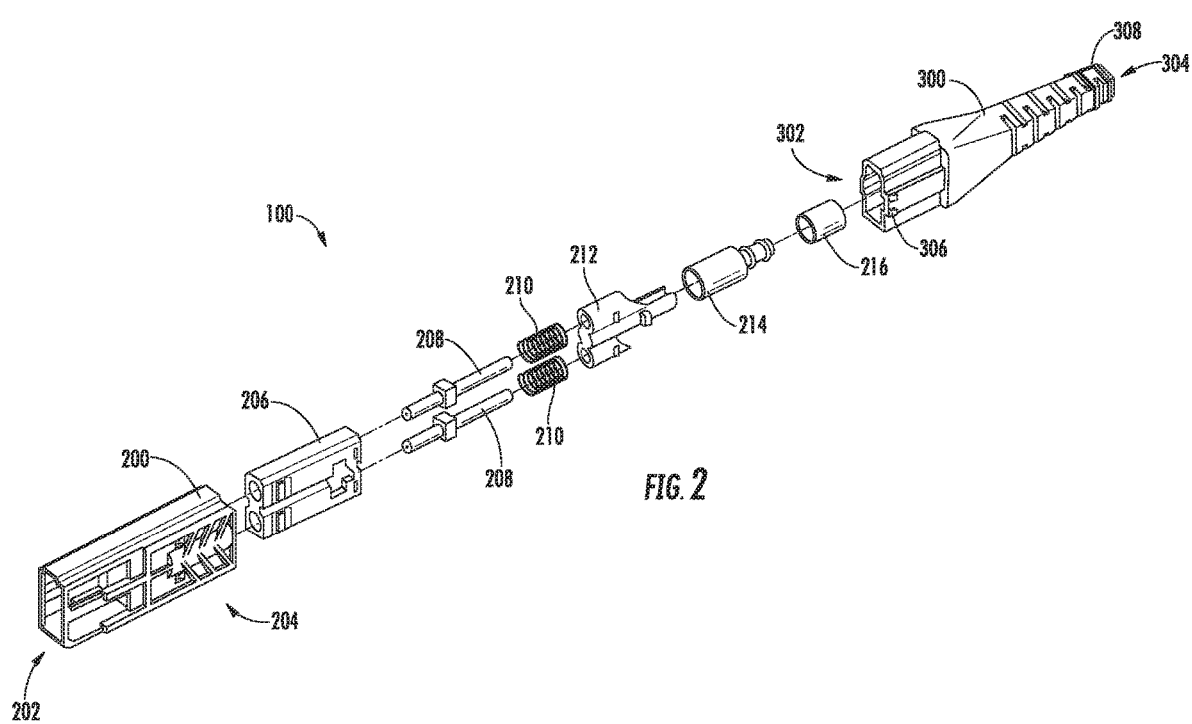
FIG. 2 provides an exploded view of the exemplary push-pull boot connector of FIG. 1.

FIG. 1 illustrates a push-pull boot connector 100 according to one exemplary embodiment of the present disclosure. FIG. 2 provides an exploded view of the push-pull connector 100 of FIG. 1. As illustrated in FIGS. 1 and 2, the push-pull boot connector 100 is a duplex uniboot connector, e.g., the push-pull boot connector 100 includes two ferrules 208 and a single strain relief boot 300. The push-pull boot connector 100 extends along a longitudinal direction L from a proximal end 102 to a distal end 104. The push-pull boot connector 100 includes a connector housing 200 defining the proximal end 102 of the push-pull boot connector 100 at a first end 202 of the housing 200. A second end 204 of the connector housing 200 is connected to a first end 302 of the strain relief boot 300 and a second end 304 of the strain relief boot 300 defines the distal end 104 of the push-pull connector 100. As will be described in more detail herein, pulling on the boot 300 allows the release of the connector 100 from the adapter 400 (see, e.g., FIGS. 3 and 4). Thus, the connector 100 may be a remote release connector and accessibility to release the connector 100 may thereby be improved.

The strain relief boot 300 may include features to promote ease of manipulating the strain relief boot 300, e.g., for assisting a user in gripping the strain relief boot 300 to push the push-pull boot connector 100 into a connection and/or to pull the push-pull boot connector 100 out of a connection such as when installing or removing the connector in a hub such as a main distribution frame. For example, such features may include one or more ridges 308 at or proximate to the second end 304 of the strain relief boot 300 which provide a profiled edge to assist in gripping the push-pull boot connector 100, e.g., with a user's fingers, at the second end 304 of the strain relief boot 300, which, as noted above, defines the distal end 104 of the push-pull boot connector 100. Accordingly, the push-pull boot connector 100 may be a remote release push-pull boot connector, e.g., in that the user does not need access to the proximal end 102 of the push-pull boot connector 100. Rather, the remote release connector 100 can be released by manipulating the strain relief boot 300, which is remote, e.g., distal, from the point of connection at the proximal end 102 of the push-pull boot connector 100.

As may be seen in FIGS. 1 and 2, the push-pull connector 100 includes a ferrule holder 206 which fits within the connector housing 200. One or more ferrules 208 may be positioned in the ferrule holder 206 of the connector housing 200. As is generally understood in the art, the ferrules 208 are each configured for supporting and aligning an optical fiber (not shown) in order to promote an optical connection of the optical fibers in the ferrules 206 with, e.g., a receptacle in a main distribution frame. The ferrules 208 may be biased forward, e.g., towards the proximal end 102 of the push-pull boot connector 100, by a pair of springs 210, each spring 210 of the pair of springs 210 corresponding to one of the ferrules 208.

As best seen in FIG. 2, the connector housing 200 may further include various internal components for supporting and/or aligning the ferrules 208 and any optical fibers therein, as well as for mounting the push-pull boot connector 100 on a cable containing the optical fibers. For example, such internal components may include a bracket 212, a first collar 214 and a second collar 216. The bracket 212 may be positioned immediately distal of the ferrules 208 and/or the springs 210, e.g., when the internal components are installed within the connector housing 200, such that the springs 210 may bias against the bracket 212 at one end of the springs 210 and against a flange on each respective ferrule 208 at the other end of the springs 210. The collars 214 and 216 may be configured to receive an open end of a cable containing the optical fibers which are received in the ferrules 208 and secure the open end of the cable within the push-pull boot connector 100.

As mentioned above, the connector housing 200 is connected to the strain relief boot 300. Such connection may be a clip-in connection, where the connector housing 200 is connected to the strain relief boot 300 by a clip on one of the strain relief boot 300 and the connector housing 200, and the clip is engaged with a clip mating face on the other of the strain relief boot 300 and the connector housing 200. For example, the strain relief boot 300 may include one or more mating clips 306 (FIG. 2) which are engageable with corresponding clip mating face(s) 218 (FIG. 1) of the connector housing 200. When connected by such a clip-in connection, the connector housing 200 and the strain relief boot 300 may thereby be free to move together along the longitudinal direction L.

Figure 3:
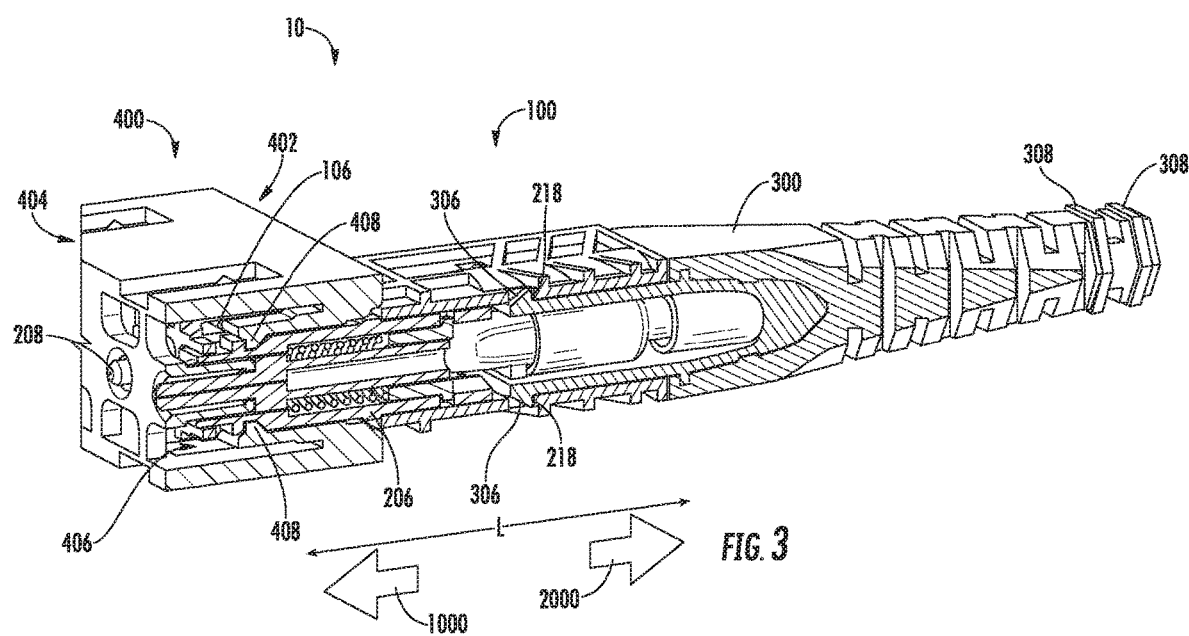
FIG. 3 provides a section view of a push-pull connection according to one or more exemplary embodiments of the present subject matter.

As shown in FIG. 3, an example push-pull connection 10 includes the push-pull boot connector 100 and an adapter 400. In various embodiments, the push-pull boot connector 100 also includes a latch release ramp 106 on one of the connector housing 200 and the strain relief boot 300. For example, in the embodiment illustrated in FIGS. 1-4, the latch release ramp 106 is positioned on the connector housing 200.

Figure 4:
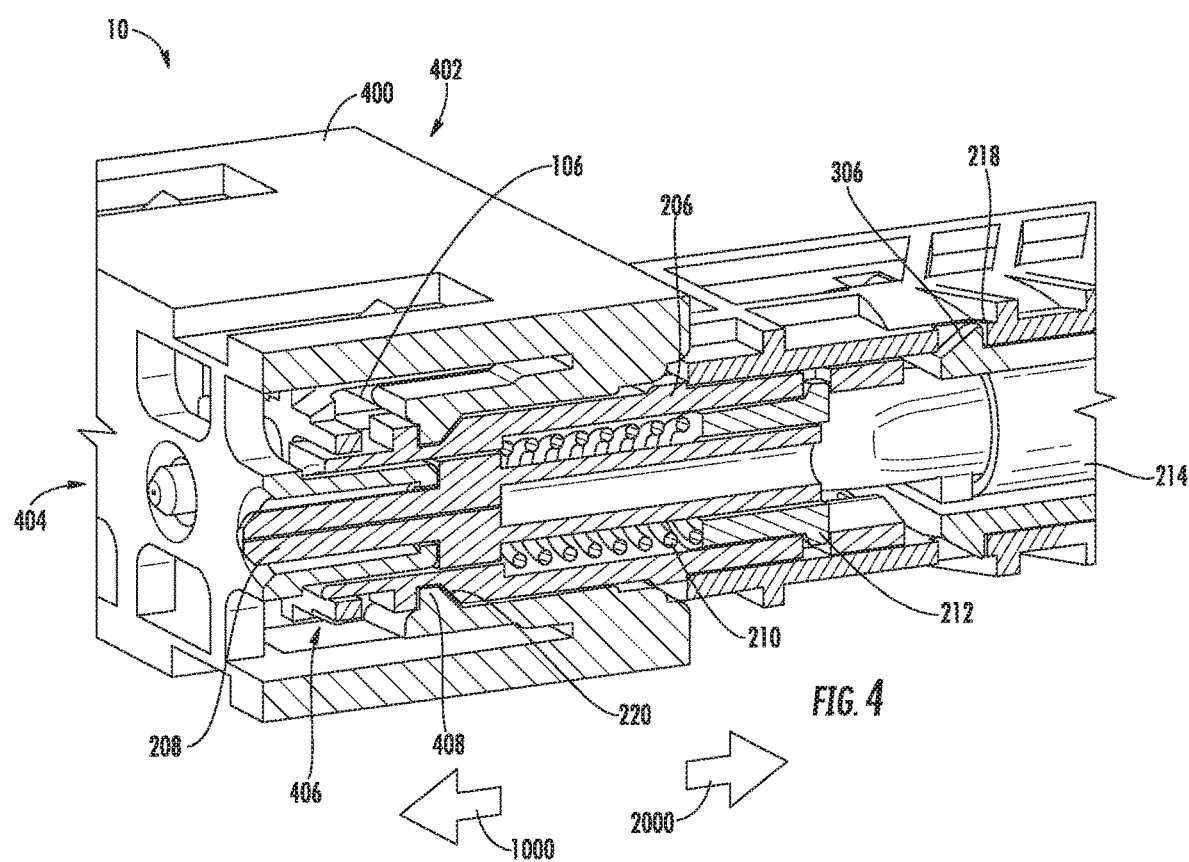
FIG. 4 provides an enlarged view of a portion of FIG. 3.
Figure 5:
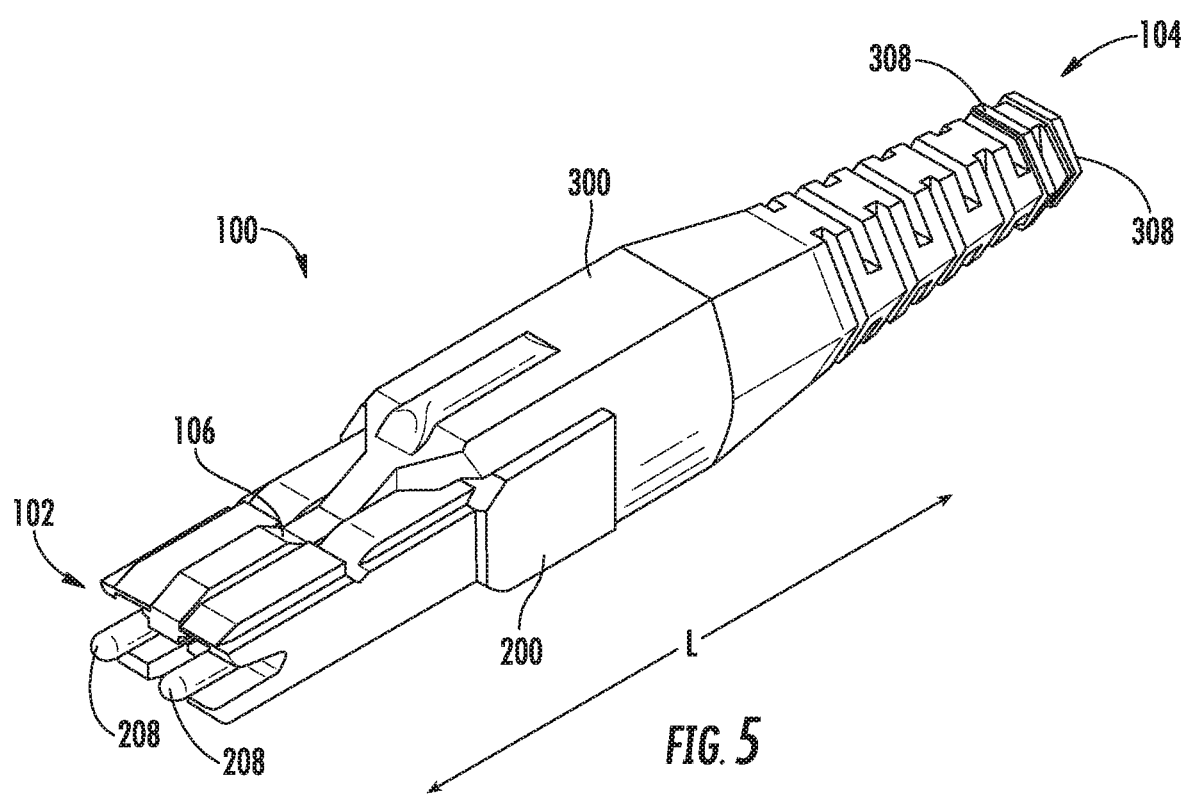
FIG. 5 provides a perspective view of a push-pull boot connector according to one or more additional embodiments of the present subject matter.

The adapter 400 includes a channel 406 configured to receive the proximal end 102 of the push-pull boot connector 100 and a latch 408 positioned in the channel 406 of the adapter 400 to engage the push-pull boot connector 100 when the push-pull boot connector 100 moves relative to the adapter 400 in a first direction 1000 along the longitudinal direction L, e.g., into the channel 406 of the adapter 400. For example, in the embodiment illustrated in FIGS. 1-4, the adapter 400 is a dual latch adapter with a pair of opposing latches 408. As shown in FIGS. 3 and 4, the pair of latches 408 are disposed at opposite sides of the channel 406, e.g., a first latch 408 is disposed at the top of the channel 406 and a second latch 408 is disposed at the bottom of the channel 406, e.g., when the push-pull connection 10 is positioned as shown in FIG. 3. The latches 408 may be mirror images of one another, e.g., each latch 408 may extend into the channel 406 from one of the opposing sides towards the other latch 408. The latches 408 may each engage with a recess or notch 220 in the connector housing 200 (FIGS. 1 and 4). Through engagement of the latches 408 with the push-pull boot connector 100, the latches 408 retain the push-pull boot connector 100 in the channel 406 of the adapter 400 when the push-pull boot connector 100 is inserted, e.g., pushed, into the channel 406 of the adapter 400. In embodiments where the latch 408 is a dual latch comprising a pair of opposing latches 408, the push-pull boot connector 100 may include a pair of latch release ramps 106 corresponding to the pair of opposing latches 408. In such embodiments, each latch release ramp 106 of the pair of latch release ramps 106 may be configured to disengage a corresponding latch 408 of the pair of opposing latches 408 from the push-pull boot connector 100 when the push-pull boot connector 100 moves in the second direction 2000 relative to the adapter 400, e.g., when the push-pull boot connector 100 is pulled out of the adapter 400.

The latch release ramp 106 of the push-pull boot connector 100 may be configured to disengage the latch 408 of the adapter 400 from the push-pull boot connector 100 when the push-pull boot connector 100 moves relative to the adapter 400 in the second direction 2000. For example, as best seen in FIGS. 3 and 4, the latch release ramp 106 may be oblique to the longitudinal direction L and may slope towards the distal end 104 of the push-pull boot connector 100. The latch release ramp 106 may extend from a high point at a proximal end of the latch release ramp 106, the proximal end of the latch release ramp 106 being, e.g., an end of the latch release ramp 106 which is closer to or oriented towards the proximal end 102 of the push-pull boot connector 100, to a low point at a distal end of the latch release ramp 106, the distal end of the latch release ramp 106 being, e.g., an end of the latch release ramp 106 which is closer to or oriented towards the distal end 104 of the push-pull boot connector 100. The latch release ramp 106 may be generally oriented or sloped opposite the latch 408, in order to disengage the latch 408 of the adapter 400 from the push-pull boot connector 100 when the push-pull boot connector 100 moves relative to the adapter 400 in the second direction 2000, e.g., when the push-pull boot connector 100 is pulled out of the adapter 400.

Figure 6:
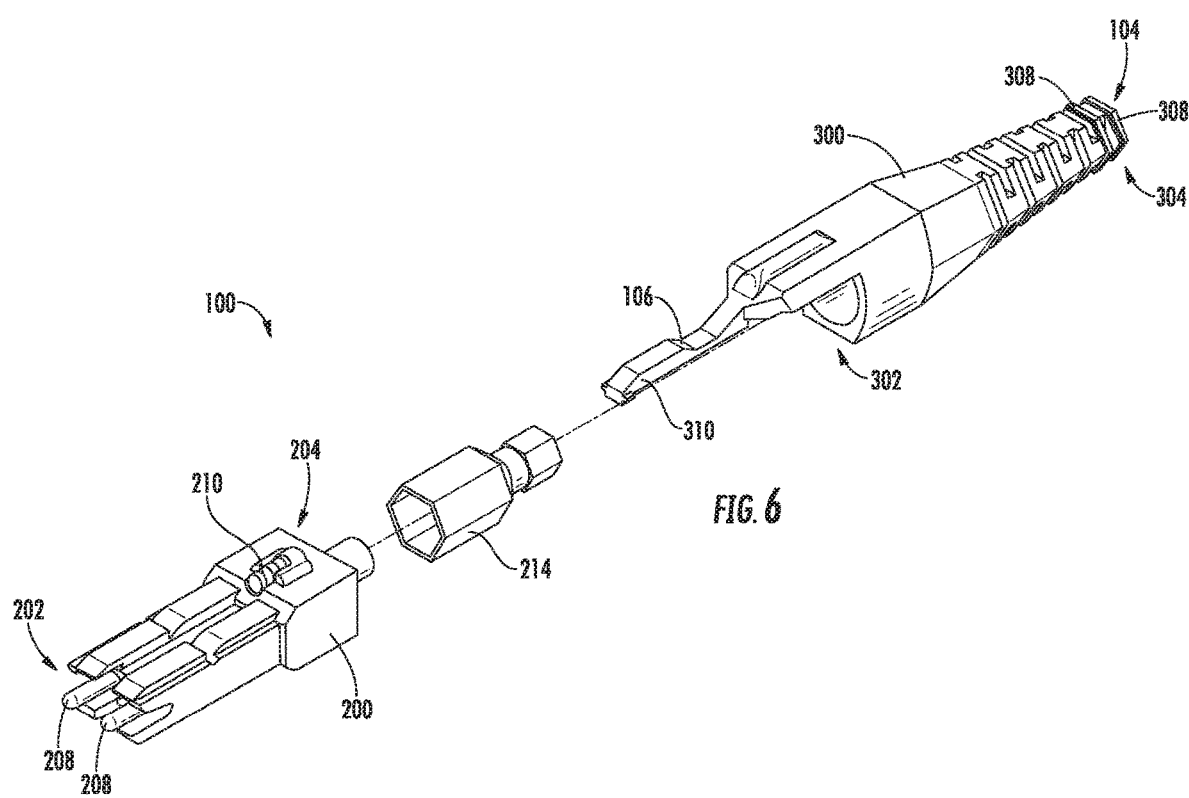
FIG. 6 provides an exploded view of the exemplary push-pull boot connector of FIG. 5.
Figure 7:
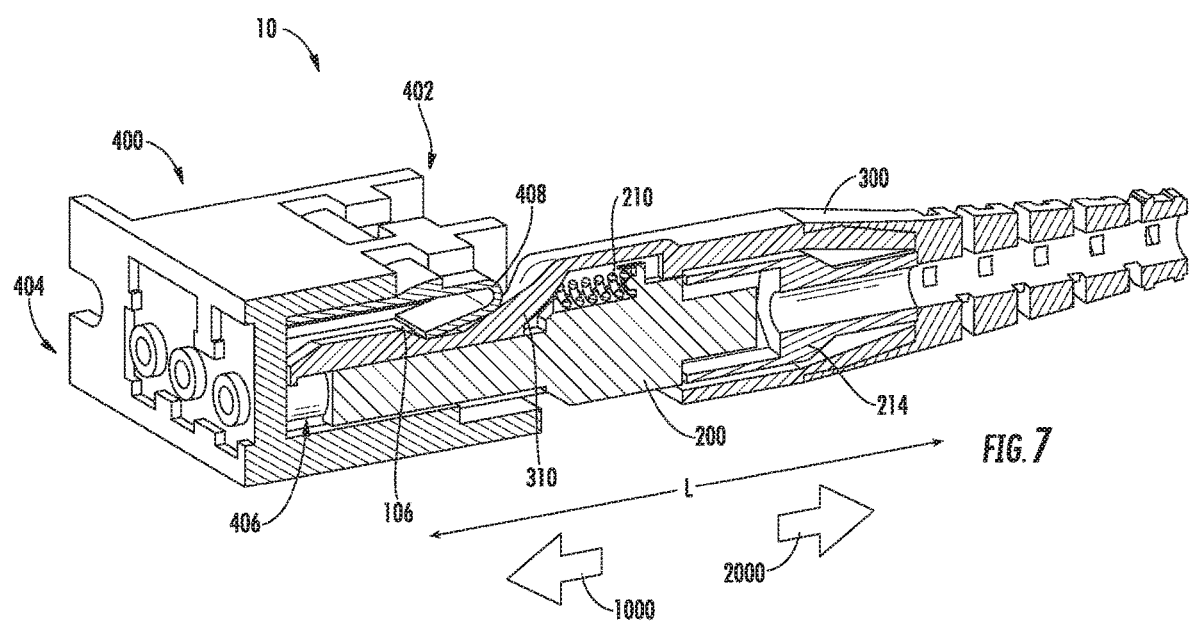
FIG. 7 provides a section view of a push-pull connection according to one or more additional exemplary embodiments of the present subject matter.
Figure 8:
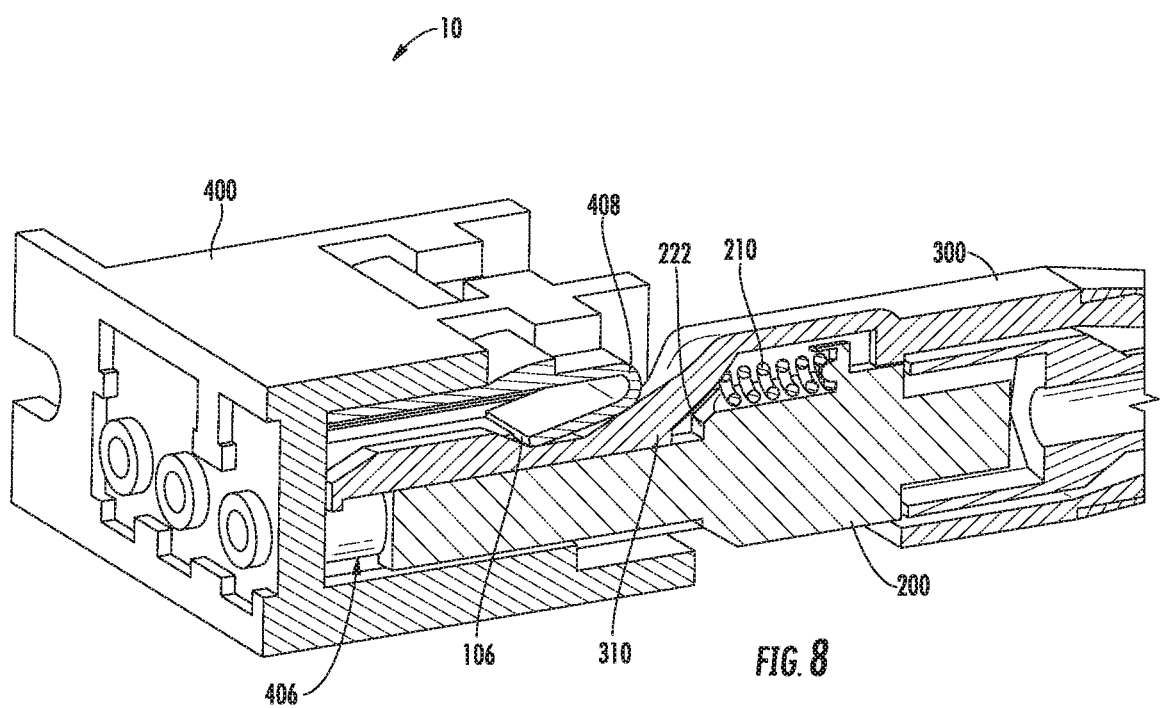
FIG. 8 provides an enlarged view of a portion of FIG. 7 with a connector release arm of the push-pull connection in a latched position.
Figure 9:
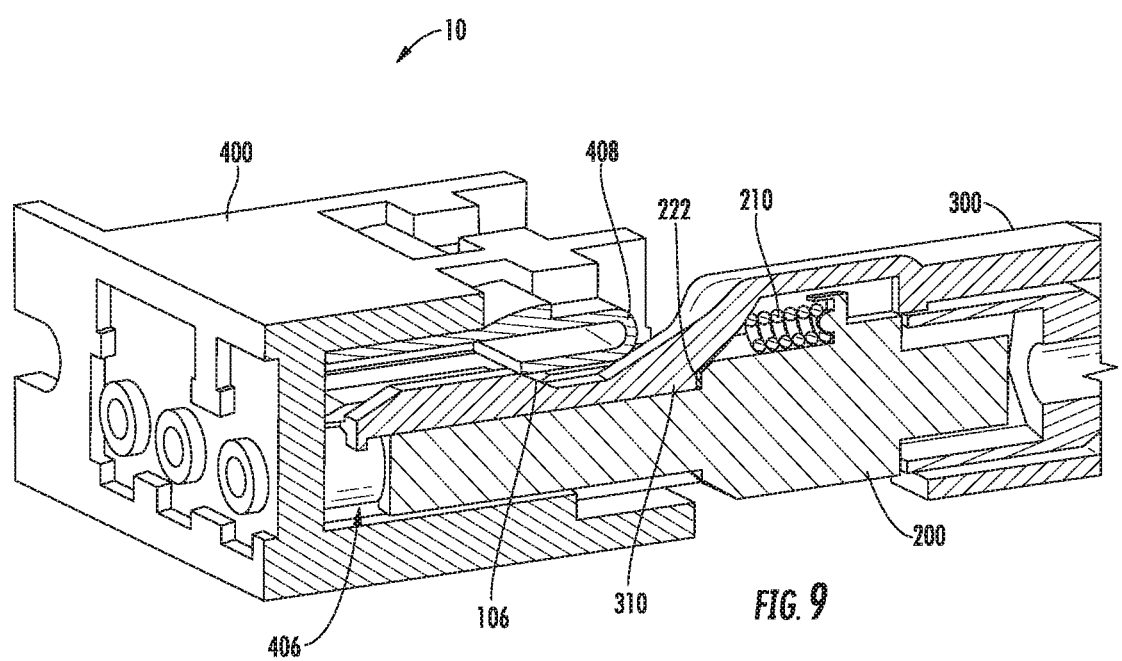
FIG. 9 provides an enlarged view of a portion of FIG. 7 with a connector release arm of the push-pull connection in a release position.
Figure 10:
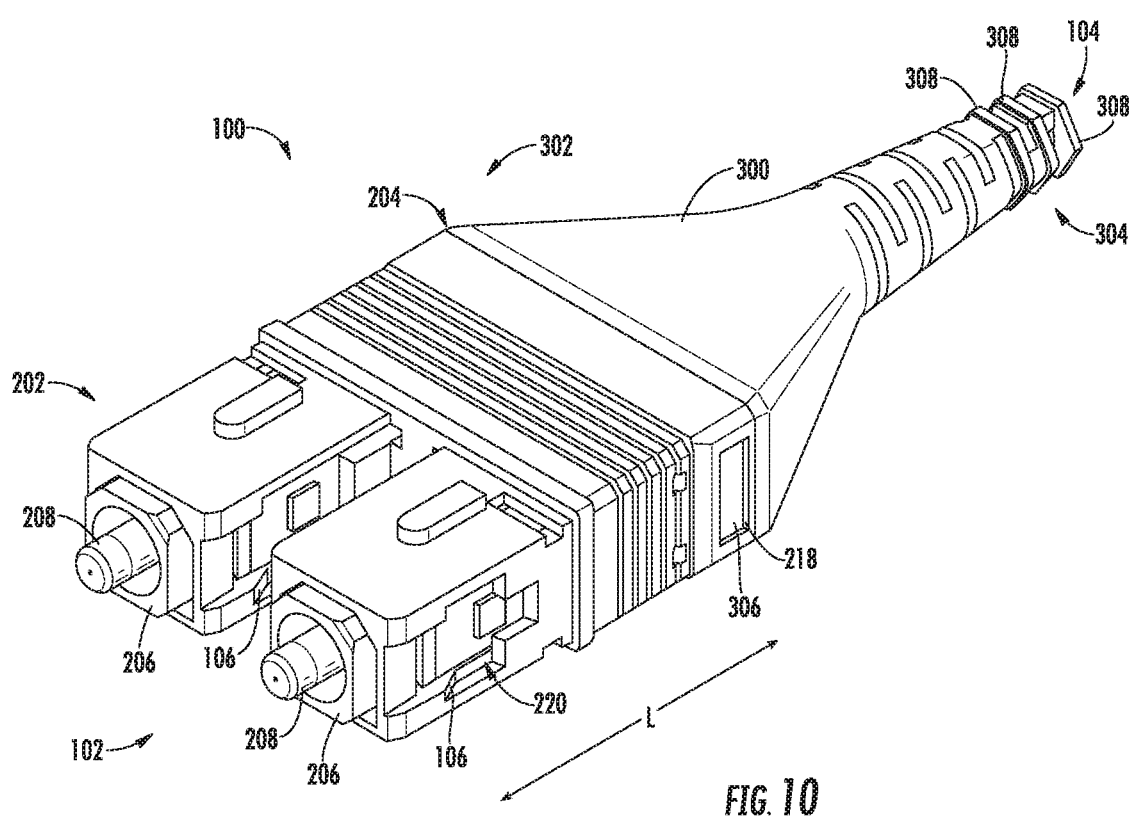
FIG. 10 provides a perspective view of a push-pull boot connector according to one or more additional embodiments of the present subject matter.

FIGS. 5-9 illustrate an additional embodiment of the present subject matter, where the push-pull boot connector 100 is a duplex uniboot connector. As shown in FIG. 6, the push-pull boot connector 100 may include a collar 214 which serves as a crimp for a jacket or strength member of a fiber optic cable. In some embodiments, e.g., as illustrated in FIGS. 7-9, the latch 408 may be a single latch. As shown, the latch 408 also may be provided as a leaf spring within the channel 406. The leaf spring latch 408 of FIGS. 7-9 may be provided as a single latch 408, as shown, or may be provided as a dual latch in other embodiments, e.g., one or more of the dual latches 408 shown in FIGS. 3, 4, 12, 13, 16, and/or 17 may also be provided as leaf spring latches 408.

In the embodiment illustrated by FIGS. 5-9, the latch release ramp 106 is positioned on the strain relief boot 300. As shown, the latch release ramp 106 is positioned on a connector release arm 310 of the strain relief boot 300. In such embodiments, the push-pull boot connector 100 may include a spring 210 positioned generally between the connector housing 200 and the strain relief boot 300, such as between the connector release arm 310 of the strain relief boot 300 and a shoulder 222 on the connector housing 200, e.g., as shown in FIGS. 7-9. The spring 210 may be configured to bias the connector release arm 310 in the first direction 1000. As most easily seen in FIGS. 8 and 9, the connector release arm 310 may be configured to move a fixed distance relative to the connector housing 200 in the second direction 2000. For example, the connector release arm 310 may be biased to or towards a latched position, as shown, e.g., in FIGS. 5 and 8, by the spring 210. The connector release arm 310 may move the fixed distance from the latched position of FIG. 8 to a release position, which is shown in FIG. 9. The fixed distance may be defined by the shoulder 222 on the connector housing 200, where the connector release arm 310 abuts the shoulder 222 when in the release position, as shown in FIG. 9. Once the connector release arm 310 has reached the release position, the connector housing 200 and the strain relief boot 300 may move together in the second direction 2000, e.g., as the push-pull boot connector 100 is pulled out of the adapter 400. Once the pulling force is removed, the spring 210 may be configured to return the connector release arm 310 in the first direction 1000 to the latched position from the release position. As shown in FIG. 9, when the connector release arm 310 is in the release position while the proximal end 102 of the push-pull boot connector 100 is received within the channel 406 of the adapter 400, the latch release ramp 106 biases the latch 408 outward, e.g., away from the push-pull boot connector 100, to disengage the latch 408 from the push-pull boot connector 100.

Figure 11:
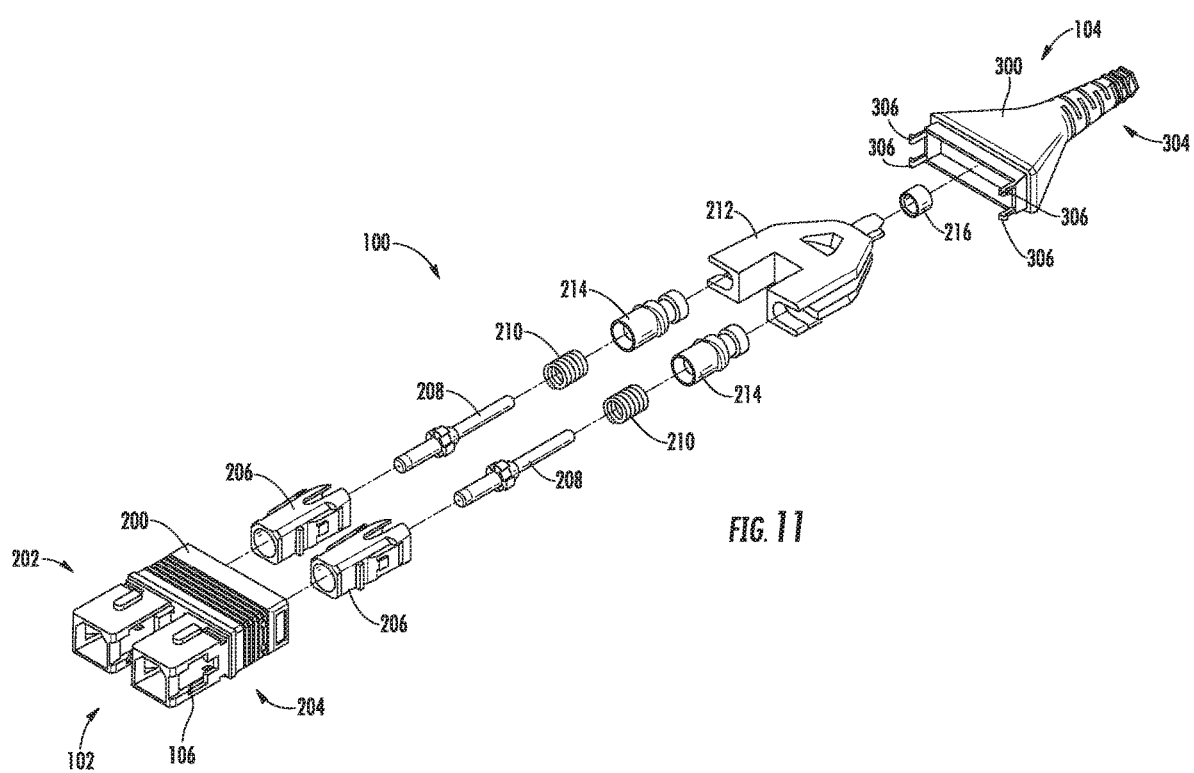
FIG. 11 provides an exploded view of the exemplary push-pull boot connector of FIG. 10.
Figure 12:
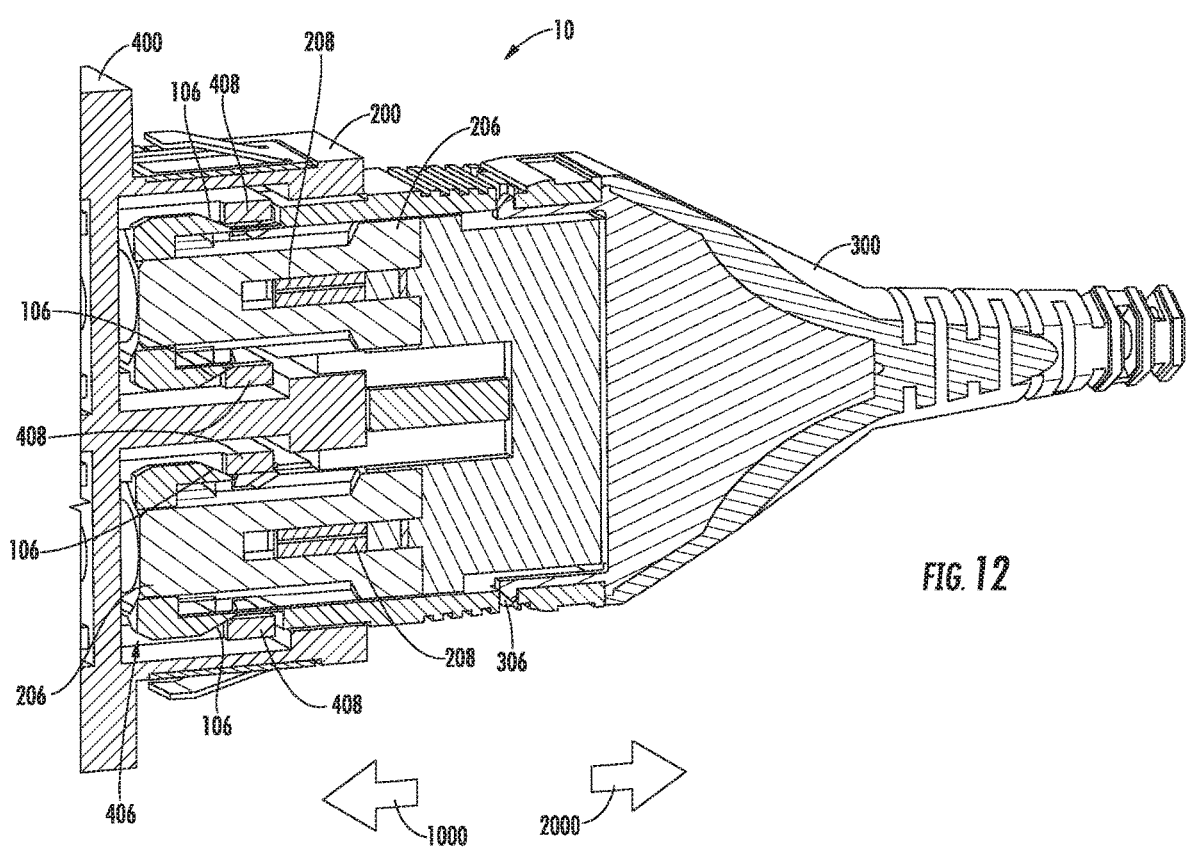
FIG. 12 provides a section view of a push-pull connection according to one or more additional exemplary embodiments of the present subject matter.
Figure 13:
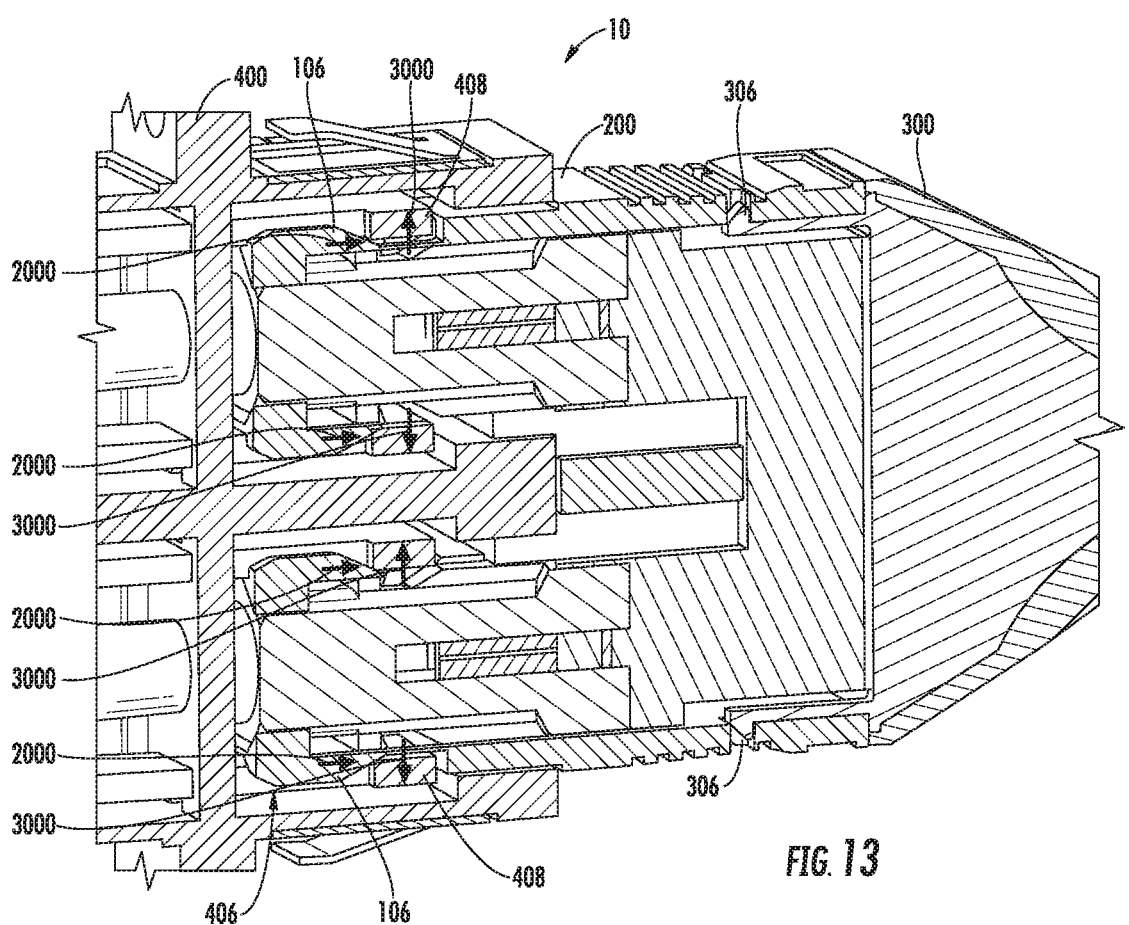
FIG. 13 provides an enlarged view of a portion of FIG. 12.
Figure 14:
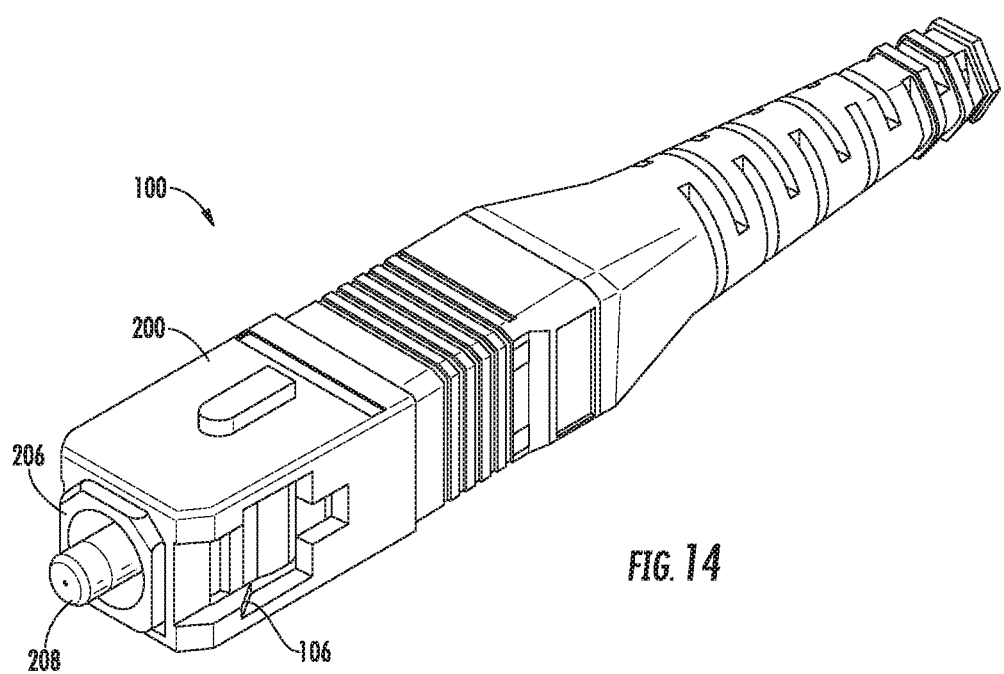
FIG. 14 provides a perspective view of a push-pull boot connector according to one or more additional embodiments of the present subject matter.
Figure 15:
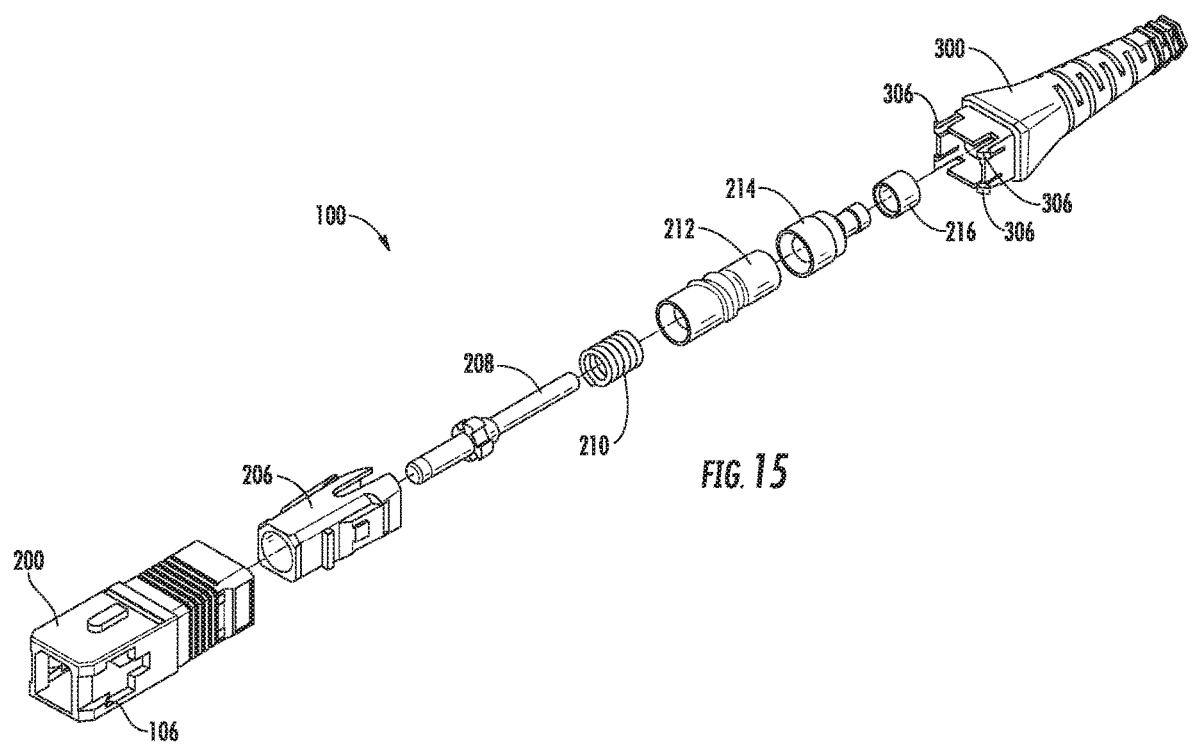
FIG. 15 provides an exploded view of the exemplary push-pull boot connector of FIG. 14.
Figure 16:
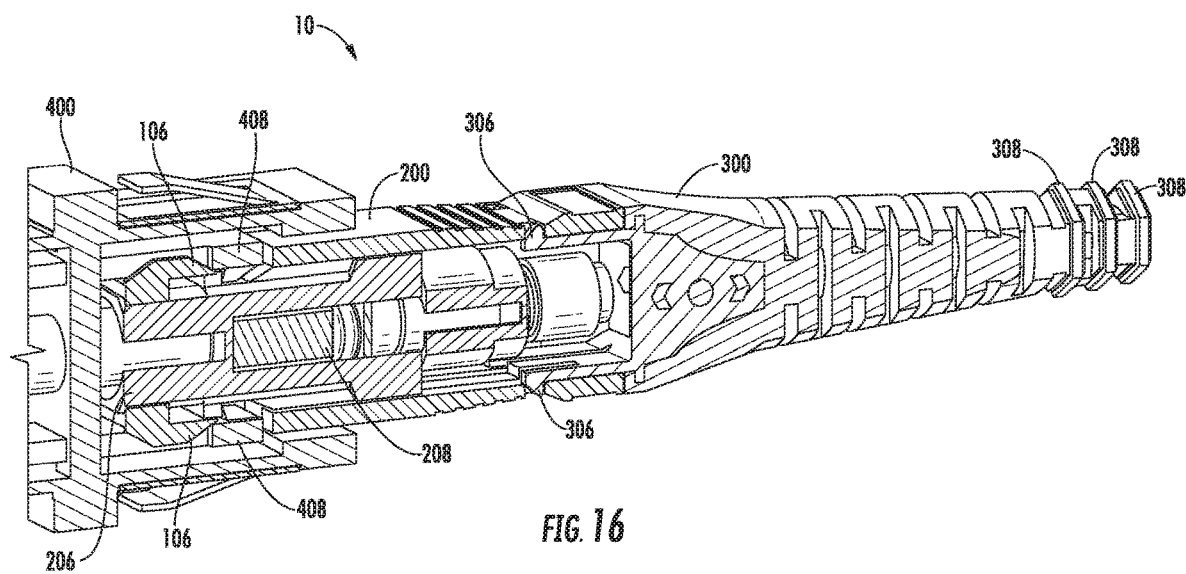
FIG. 16 provides a section view of a push-pull connection according to one or more additional exemplary embodiments of the present subject matter.

In some embodiments, e.g., as illustrated in FIGS. 10-13, the push-pull boot connector 100 may be a SC duplex uniboot connector. In such embodiments, e.g., as shown in FIGS. 10-13, the latch release ramp 106 may be provided on the connector housing 200 of the push-pull boot connector 100. In some embodiments, the latch release ramp 106 may be provided proximate the first end 202 of the connector housing 200 and close to the portion of the connector housing 200 in which the ferrule holders 206 are received. As shown in FIG. 11, the push-pull boot connector 100 may include two ferrules 208 and two corresponding ferrule holders 206, with the ferrules 208 biased forward, e.g., to or towards the proximal end 102 of the push-pull boot connector 100, by springs 210 positioned between a flange on each ferrule 208 and a first collar 214. The push-pull boot connector 100 may further include a bracket 212 distal of the first collar 214 and a second collar 216 distal of the bracket 212. One or both of the collars 214 and 216 may be configured to engage and support an end of a fiber optic cable containing the optical fibers which are routed through the ferrules 208. As shown in FIGS. 12 and 13, when the push-pull boot connector 100 moves relative to the adapter 400 in the second direction 2000, e.g., from the installed position shown in FIG. 12 to the release position shown in FIG. 13, the latch release ramp 106 biases the latch 408 outward, e.g., away from the push-pull boot connector 100 along a third direction 3000 which is generally perpendicular to the longitudinal direction L, to disengage the latch 408 from the push-pull boot connector 100.

As another example, the push-pull boot connector 100 may also be a SC simplex connector, e.g., including a single ferrule 208 for a single optical fiber, as illustrated in FIGS. 14-17. In such embodiments, e.g., as shown in FIGS. 14-17, the latch release ramp 106 may be provided on the connector housing 200 of the push-pull boot connector 100. In some embodiments, the latch release ramp 106 may be provided proximate the first end 202 of the connector housing 200 and close to the portion of the connector housing 200 in which the ferrule holders 206 are received.

The present subject matter provides numerous advantages over the prior art, as will be apparent to those of ordinary skill. For example, utilization of an industry standard recognized connector design that has a dual latching feature that does not protrude beyond the body of the connector, therefore minimizing the space required for the connection to occur. This in turn allows a greater density to be mounted within a standard footprint of one rack unit (1 RU). The density of a 1 RU panel can be increased, e.g., up to 288 fibers. As another example, the combination of a connector variant with a uniboot design minimizes cable volume as compared to a design including more than one boot. Ease of access to install or remove the push-pull boot connector 100 is increased, e.g., in that the installation or removal can be performed by pushing or pulling on the connector boot 300 instead of needing access to the connector housing 200. No remote pulling latch to hinder cable routing or finger access is included. The foregoing are merely examples of potential benefits and advantages the present subject matter may provide and are in no way limiting, the present subject matters may provide additional advantages, and embodiments of the present subject matter may not necessarily include any or all of the specific example advantages described in this paragraph.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A push-pull boot connector for a fiber optic cable, the push-pull boot connector comprising:
a strain relief boot extending along a longitudinal direction and including one or more mating clips extending in a direction normal to the longitudinal direction; and
a connector housing defining one or more corresponding clip mating faces engageable with the one or more mating clips of the strain relief boot,
wherein a latch release ramp is disposed on one of the connector housing and the strain relief boot, the latch release ramp being configured to contact a latch on an adapter and push the latch out of a notch of the push-pull boot connector when the push-pull boot connector moves relative to the adapter.

2. The push-pull connector of claim 1, wherein the one or more mating clips engage with the one or more corresponding clip mating faces such that the strain relief boot and connector housing move together along the longitudinal direction.

3. The push-pull connector of claim 1, wherein the one or more mating clips includes at least two mating clips, and wherein each of the at least two mating clips is engageable with a discrete clip mating face of the one or more clip mating faces.

4. The push-pull connector of claim 3, wherein the two mating clips are spaced apart from one another.

5. The push-pull connector of claim 3, wherein one of the two mating clips is disposed on a first side of the strain relief boot and another of the two mating clips is disposed on a second side of the strain relief boot opposite the first side.

6. The push-pull connector of claim 1, wherein the strain relief boot has a first end and a second end with respect to the longitudinal direction, wherein the first end is closer to the connector housing than the second end, and wherein at least one of the one or more integral mating clips is disposed adjacent to the first end.

7. The push-pull connector of claim 1, wherein at least one of the one or more mating clips defines a ramped surface angularly offset from the longitudinal direction, and wherein the ramped surface is disposed adjacent to an end of the strain relief boot.

8. The push-pull connector of claim 1, wherein at least a portion of the strain relief boot is insertable into the connector housing, and wherein the one or more mating clips engage the clip mating faces from an inside of the connector housing.

9. The push-pull connector of claim 1, wherein the connector housing defines a first end and a second end with respect to the longitudinal direction, wherein the second end is closer to the strain relief boot than the first end, and wherein at least one of the one or more clip mating faces is closer to the second end than the first end of the connector housing, and wherein the at least one of the one or more mating faces is spaced apart from the second end of the connector housing.

10. The push-pull connector of claim 1, wherein the strain relief boot comprises features to promote ease of manipulating the strain relief boot.

11. The push-pull connector of claim 1, wherein the connector housing is configured to receive a ferrule holder including one or more ferrules associated with one or more optical fibers.

12. The push-pull connector of claim 1, wherein the push-pull connector comprises an LC connector.

13. The push-pull connector of claim 12, wherein the push-pull connector is engageable with an adapter, and wherein the push-pull connector is disengageable from the adapter by pulling on the strain relief boot.

14. A push-pull connection comprising:
a push-pull boot connector for a fibre optic cable, the push-pull boot connector comprising:
a strain relief boot extending along a longitudinal direction and including one or more mating clips extending in a direction normal to the longitudinal direction; and
a connector housing defining one or more corresponding clip mating faces engageable with the one or more mating clips of the strain relief boot; and an adapter comprising a channel configured to receive the push-pull boot connector, the adapter comprising a latch disposed in the channel and configured to selectively retain the push-pull connector in the channel of the adapter until a latch release ramp of the push-pull boot connector displaces the latch from the push-pull boot connector during movement between the adapter and push-pull boot connector.

15. The push-pull connection of claim 14, wherein the one or more mating clips includes at least two mating clips, and wherein each of the at least two mating clips is engageable with a discrete clip mating face of the one or more clip mating faces.

16. The push-pull connection of claim 14, wherein one of the two mating clips is disposed on a first side of the strain relief boot and wherein one of the two mating clips is disposed on a second side of the strain relief boot opposite the first side.

17. A push-pull connection comprising:
a push-pull boot connector for a fiber optic cable, the push-pull boot connector comprising a strain relief boot and a connector housing, wherein the push-pull boot connector comprises a latch release ramp; and
an adapter comprising a channel configured to receive the push-pull connector, the adapter comprising a latch configured to selectively retain the push-pull connector until the push-pull boot connector and adapter are translated such that the latch release ramp displaces the latch from the push-pull boot connector.

* * * * *